No. 864,379. PATENTED AUG. 27, 1907.
O. JUNGHANS.
SPEED INDICATOR.
APPLICATION FILED JULY 26, 1906.
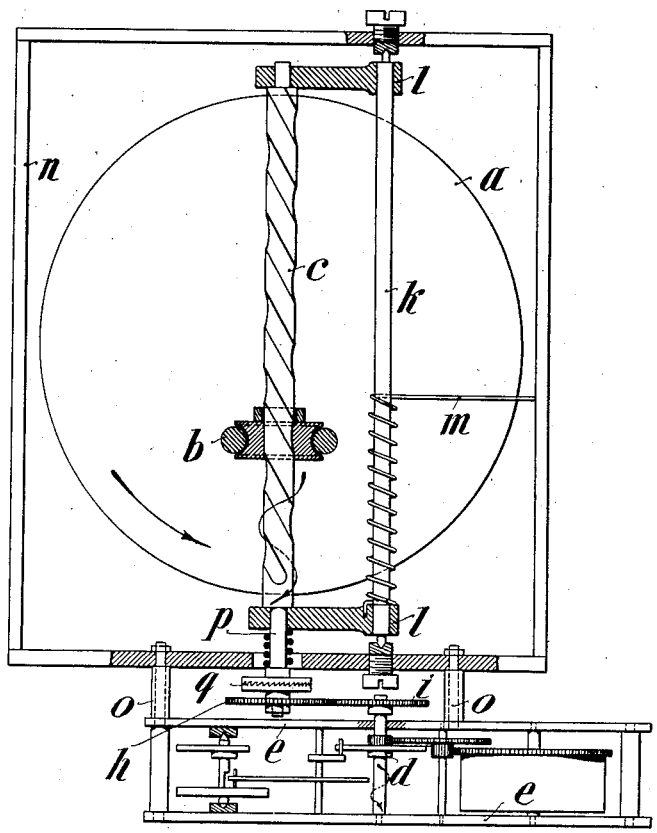
WITNESSES:
Fred White
René Nuine
INVENTOR:
Oskar Junghans,
By his Attorneys
Arthur C. Fraser & Usina

UNITED STATES PATENT OFFICE.

OSKAR JUNGHANS, OF SCHRAMBERG, GERMANY.

SPEED-INDICATOR.

No. 864,379.　　　Specification of Letters Patent.　　　Patented Aug. 27, 1907.

Application filed July 26, 1906. Serial No. 327,809.

*To all whom it may concern:*

Be it known that I, OSKAR JUNGHANS, engineer, a subject of the King of Würtemberg, residing at Schramberg, in the Kingdom of Würtemberg, Germany, have invented certain new and useful Improvements Relating to an Improved Speed-Indicator, of which the following is a specification.

This invention relates to that type of speed indicator for rotary movements having friction gearing in which the friction gear consists of a surface plate driven by the movement to be measured, and of a disk in contact with said surface plate and adapted to move up and down a screw spindle which is in connection with a clockwork mechanism or other mechanism for imparting a uniform movement of the screw spindle. The said disk moves any suitable indicating mechanism. In the known speed indicators of this description clockwork or other mechanism, which is usually provided with a retarding means of some kind to cause such mechanism to impart a uniform rotary motion to the screw spindle with respect to the surface plate, is spring mounted.

The feature of the present invention consists essentially in the clockwork or other mechanism being in rigid connection with the casing, while the screw spindle is so mounted as to be able to swing outward and is actuated by a torsional spring, which keeps the disk pressed up against the surface plate.

The annexed drawing illustrates a constructional form of the apparatus in a front view and partial section. The parts well known are omitted.

The friction gear consists as usual of the surface plate $a$, and the disk $b$. The surface plate $a$ provided with suitable gearing is driven by the movement to be measured. This is effected, when using the apparatus for instance for automobiles, and the like, by means of a special driving device which either consists of gearing in connection with one of the front wheels, or of a roller rotated by the circumference of one of said wheels. The screw spindle $c$ which is provided with a quick thread on which the disk $b$ provided with a corresponding thread is guided, is mounted in arms $l$ fixed to the rotary auxiliary shaft $k$, said spindle $c$ thus being able to swing around the axis of shaft $k$. Mounted on this shaft $h$ is a torsional spring $m$ which holds the screw spindle $c$, and the disk $b$ pressed towards the surface plate $a$. The device for imparting a uniform movement to the spindle consists in this case of a complete clockwork mechanism provided with a spring and is shown as rigidly connected, independent of the spindle bearing, by pillars $o$ to the casing $n$ of the speed indicator. It may, however, be located in any other suitable position. The shaft $d$ of the clockwork, upon the extension of which the spindle of these types of speed indicators was formerly mounted is in this case entirely distinct from said spindle, and carries at its upper end a wheel $i$ between the plate $e$ and the casing of the speed indicator.

Engaging with wheel $i$ is a wheel $h$ which is fixed on the lower end of the screw spindle $c$. The arrangement of the clockwork mechanism is such, that the shaft of the wheel $d$, or $i$ lies co-axially or approximately co-axially to the auxiliary shaft $k$. The lower part $p$ of the screw spindle $c$ is provided with ratchet clutch $q$, one part of which is under the action of a spring and can be slid up and down.

The operation of this apparatus, when constructed as shown, is as follows: Should the surface plate $a$ rotate in that direction indicated by the arrow in the drawing (which would be the case were the speed indicator in use) the disk is likewise rotated and screws itself, in the known manner, up the spindle $c$ in accordance with the increase of speed, towards the center of the surface plate $a$. A rotary movement etc. in the direction indicated by the arrow is thereby imparted to the spindle $c$, this movement being communicated to the clockwork as the ratchet clutch is in engagement.

The clockwork mechanism in the present construction assists to rotate the spindle; should the rotation of the disk $b$ be more rapid than the rotation of the spindle then the disk would always screw itself up towards the center of the surface plate $a$ until it reached a radius corresponding to the revolutions of the spindle. Should the speed of the surface plate $a$ slacken, then the reverse movement of the disk $b$ would take place to a corresponding extent, that is to say the disk $b$ would continue to descend until its revolutions were again equal to those of the spindle $c$. When the power and movement of the spindle $c$ is being communicated to the clockwork or other mechanism, the wheel $h$, spindle $c$ and disk $b$ would endeavor to rotate around the center of the wheel $i$, the wheels remaining in mesh. This would result in a pressure of the spindle or disk $b$ towards the surface plate $a$, which pressure would insure a certain and sufficiently powerful contact between the surface plate $a$ and disk $b$. This pressure relaxes as soon as the drive from the surface plate $a$ ceases. The descending movement of the disk $b$, towards the periphery of the surface plate $a$, which takes place when the speed is reduced or when the apparatus is thrown out of gear is effected by the screw thread of the uniformly rotating screw spindle $c$. The spindle is hereby further rotated, in that direction indicated by the arrow, by the power composed of the weight of the disk and tension of the clockwork spring; the decrease in the pressure of the disk on the surface plate as already described also facilitates the movement of the spindle. Upon the disk reaching its lowest position, the ratchet clutch $q$ disengages itself in consequence of the pressure of the wheels $h$ and $i$, and the clockwork continues to run free. The clockwork may be used simultaneously as a means for measuring time. There is further the advantage that, when the clockwork is used for operating a suitable recording apparatus, the time, for instance of stopping of an automobile is also recorded. Should this not be necessary, then the clockwork spring need not be provided at all, the rotation of the spindle c being effected in such a case with increasing speed solely by means of the disk b rotated by the surface plate a, or with reduced speed by the weight of the disk b, or by any other suitable means.

While in the apparatus shown the plate is driven by the mechanism, the speed of which is to be indicated, and the screw spindle is driven by the clockwork, it is obvious that other arrangements could be adopted without departing from the invention. It should also be mentioned that the mode of mounting the spindle c is known, and is not broadly claimed but only for the arrangement hereinbefore described.

I claim:—

1. In a speed indicator, a rotatable plate, a rotatable threaded shaft adapted to swing toward and from said plate, one of said parts being adapted to be driven from the device the speed of which is to be indicated, a disk on said shaft normally in contact with said plate, said disk adapted to move along said shaft in response to speed variations, a clockwork mechanism mounted in a fixed position so that it is not turned during the swinging movements of said shaft, and means for connecting said shaft to one of the rotative elements of said mechanism, said means being adapted to permit the shaft to swing freely toward and from said plate without being disconnected from said mechanism.

2. In a speed indicator, a rotatable plate, a rotatable threaded shaft adapted to swing toward and from said plate, one of said parts being adapted to be driven from the device the speed of which is to be indicated, a disk on said shaft normally in contact with said plate, said disk adapted to move along said shaft in response to speed variations, a clockwork mechanism mounted in a fixed position so that it is not turned during the swinging movements of said shaft, means for connecting said shaft to one of the rotative elements of said mechanism adapted to permit the shaft to swing freely toward and from said plate, and a spring normally pressing said shaft toward said plate.

3. In a speed indicator, a rotatable plate, a rotatable threaded shaft, one of said parts being adapted to be driven from the device the speed of which is to be indicated, a disk on said shaft normally in contact with said plate, said disk adapted to move along said shaft in response to speed variations, and means for mounting said shaft, such means being arranged at the side of the shaft toward which the plate tends to move the disk so that the latter is pressed more forcibly against said plate as it moves toward the center thereof than when it moves in an opposite direction.

4. In a speed indicator, a rotating plate, a threaded shaft, a friction disk thereon bearing against said plate, a tilting shaft having bearings for said threaded shaft, a gear connected with said threaded shaft, a gear meshing with said first gear and mounted in approximately axial alinement with said tilting shaft, said plate rotating normally in a direction which tends to tilt said shaft in its bearings toward said plate as the disk is moved toward the center of the plate.

5. In a speed indicator, a rotating plate, a threaded shaft, a friction disk thereon bearing against said plate, a tilting shaft having bearings for said threaded shaft, a gear connected with said threaded shaft, a gear meshing with said first gear and mounted in approximately axial alinement with said tilting shaft.

6. In a speed indicator, a rotating plate, a threaded shaft, a friction disk thereon, bearing against said plate, a tilting shaft having bearings for said threaded shaft, a gear, a clutch between such gear and said shaft adapted to operate when said disk has traveled to the end of said shaft, and a clockwork mechanism connected with said gear.

In witness whereof, I have hereunto signed my name in the presence of two subscribing witnesses.

OSKAR JUNGHANS.

Witnesses:
A. JUNGHANS,
E. KÖNIG.